United States Patent
Sabe et al.

(10) Patent No.: US 7,076,334 B2
(45) Date of Patent: Jul. 11, 2006

(54) ROBOT APPARATUS AND METHOD AND SYSTEM FOR CONTROLLING THE ACTION OF THE ROBOT APPARATUS

(75) Inventors: Kohtaro Sabe, Tokyo (JP); Kazuo Ishii, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/989,713

(22) Filed: Nov. 16, 2004

(65) Prior Publication Data

US 2005/0090935 A1 Apr. 28, 2005

Related U.S. Application Data

(63) Continuation of application No. 10/182,805, filed on Feb. 5, 2003, now Pat. No. 6,889,117.

(30) Foreign Application Priority Data

Dec. 6, 2000 (JP) ............................ P2000-372092
Dec. 6, 2001 (WO) ........................ PCT/JP01/10699

(51) Int. Cl.
*G06F 19/00* (2006.01)

(52) U.S. Cl. ...................... 700/245; 700/246; 700/247; 700/248; 318/568.12; 318/568.15; 318/568.17; 901/1; 701/23

(58) Field of Classification Search ........ 700/245–264, 700/275; 318/538.12, 568.15, 568.17, 568.11; 701/23, 25, 70; 707/204, 205; 901/1, 46, 901/47

See application file for complete search history.

(56) References Cited

U.S. PATENT DOCUMENTS

| | | | |
|---|---|---|---|
| 6,381,515 B1 | 4/2002 | Inoue et al. | 700/245 |
| 6,415,203 B1 | 7/2002 | Inoue et al. | 700/245 |
| 6,421,585 B1 | 7/2002 | Takamura | 700/245 |
| 6,438,457 B1 | 8/2002 | Yokoo et al. | 700/245 |
| 6,442,450 B1 | 8/2002 | Inoue et al. | 700/245 |
| 6,463,356 B1 | 10/2002 | Hattori et al. | 700/245 |
| 6,505,097 B1 | 1/2003 | Fujita et al. | 700/245 |
| 6,668,211 B1 * | 12/2003 | Fujita et al. | 700/245 |

FOREIGN PATENT DOCUMENTS

JP 2000-218065 8/2000

(Continued)

OTHER PUBLICATIONS

Mostefai et al., On the optimisation of behaviours surveillance structure in multirobots systems, 1996, IEEE, p. 1554-1559.*

(Continued)

*Primary Examiner*—Thomas G. Black
*Assistant Examiner*—McDieunel Marc
(74) *Attorney, Agent, or Firm*—Frommer Lawrence & Haug LLP; William S. Frommer; Thomas F. Presson

(57) ABSTRACT

A main robot apparatus generates a sound scale command at a command generating state (ST2) to enter into a state of waiting for a reaction of a slave robot apparatus (ST3). When the slave robot apparatus outputs a emotion expressing sound responsive to a sound scale command issued by the main robot apparatus, the main robot apparatus recognizes this emotion expressing sound to output the same emotion expressing sound. In a state of the reaction action (ST4), the main robot apparatus selects an action (NumResponse), depending on the value of the variable NumResponse which has counted the number of times of the reactions to output the action.

23 Claims, 14 Drawing Sheets

FOREIGN PATENT DOCUMENTS

| | | |
|---|---|---|
| JP | 2000-233386 | 8/2000 |
| JP | 2001-157983 | 6/2001 |
| WO | WO 00/32361 | 6/2000 |

OTHER PUBLICATIONS

Hara et al., Real-time facial interaction between human and 3D face robot agent, 1996, IEEE, pp. 401-409.

Kobayashi et al., Study on face robot for active human interface, 1993, IEEE, pp. 276-281.

Ogata et al., Emotion communication robot: WAMOEBA-2R—Emotion model and evaluation experiments-1999, Internet, pp. 1-16.

Thrum et al., Probabillistic algorithms and the interactive museum tour-guide robot Minerva, 2000, Internet, pp. 1-35.

* cited by examiner

| NODE OF DESTINATION OF TRANSITION | node 100 | | | | | PROBABILITY OF TRANSITION TO OTHER NODES Di | | | | |
|---|---|---|---|---|---|---|---|---|---|---|
| | INPUT EVENT NAME | DATA NAME | DATA RANGE | | | A | B | C | D | n |
| | | | | | | node 120 | node 120 | node 1000 | | node 600 |
| OUTPUT BEHAVIOR | | | | | | ACTION 1 | ACTION 2 | MOVE BACK | | ACTION 4 |
| 1 | BALL | SIZE | 0.1000 | | | 30% | | | | |
| 2 | PAT | | | | | | 40% | | | |
| 3 | HIT | | | | | | 20% | | | |
| 4 | MOTION | | | | | | | | | |
| 5 | OBSTACLE | DISTANCE | 0.100 | | | | | 50% | | |
| 6 | | JOY | 50.100 | | | | | 100% | | |
| 7 | | SUPRISE | 50.100 | | | | | | | |
| 8 | | SADNESS | 50.100 | | | | | | | |

| SOUND SCALE PATTERN | CONTENTS OF COMMAND |
|---|---|
| A | UTTER 'PI - PO - PA' |
| B | UTTER 'PI - RO - LI - RO - LI' |
| ⋮ | ⋮ |

FIG.12

ROBOT APPARATUS AND METHOD AND SYSTEM FOR CONTROLLING THE ACTION OF THE ROBOT APPARATUS

This is a Continuation Application of U.S. Ser. No. 10/182,805, filed on Feb. 5, 2003, now U.S. Pat. No. 6,889,117 which is hereby incorporated by reference in its entirety herein.

TECHNICAL FIELD

This invention relates to a robot apparatus, an action controlling method for controlling the action of the robot apparatus and an action controlling system for controlling the action of plural robot apparatus. More specifically, the present invention relates to a robot apparatus convenient for performing an autonomous action, an action controlling method and an action controlling system for such robot apparatus

BACKGROUND ART

Recently, a robot apparatus, formed after the shape of an animal, such as a dog or a cat, has been presented to the market. Among these robot apparatus, there is such an apparatus which acts autonomously responsive to the information from outside or to an internal state of the robot apparatus. For example, the robot apparatus is designed to act under a command from a user, as the information from outside, or depending on the level of the emotion, indicating its internal state.

The following are the functions of the robot apparatus operating responsive to the level of the emotion indicating the internal state of the robot apparatus.

The robot apparatus has variable states A to D, as shown for example in FIG. 1, and is designed to make transitions between these states under a preset condition or at preset timings. The states A to D are defined by the postures assumed or actions performed by the apparatus when in the states concerned.

For example, when the robot apparatus is 'angry' when in the state A, it correspondingly utters, e.g., 'pi-ro-li-ro-li' and, when the robot apparatus is 'happy' when in the state B, it correspondingly utters 'pi-po-pa'.

Moreover, by the functions of the robot apparatus, operating under a command from a user, the interaction between the robot apparatus and the user takes place. These functions may be enumerated by, for example, those reacting to contact by the user from outside, and those in action under a command from outside.

For example, by providing the robot apparatus with a touch sensor detecting the contact thereof with outside, and by causing the action of the robot apparatus responsive to the contact thereof with the touch sensor, there is realized the function of the robot apparatus reacting to contact from outside, such as by the user. The touch sensor may, for example, be mounted on, e.g., a head of the robot apparatus.

As for the function of the robot apparatus, operating under an external command, the following technique may be used.

For example, an equipment outputting a scale command, as an external command, may be exploited. The scale command forms a command for causing the robot apparatus to express a preset action by the scale sound. The robot apparatus recognizes the scale command, output by the external control equipment, and performs the action corresponding to the scale command. The external communication equipment, outputting this scale command, may be enumerated by, for example, a sound commander. Meanwhile, the technique of the control system of the apparatus, exploiting the scale command, has recently come to be established.

By such contact as the information from outside, or the scale command, the robot apparatus in the standby state detects 'being patted' by soft touch at a touch sensor at the scalp or 'being hit' by strong touch at the touch sensor as shown in FIG. 2. As a reaction thereto, the robot apparatus utters 'pi-po-pa' as the sound indicating the anger, on detection of 'being patted', while uttering 'pi-ro-li-ro-li' as the sound indicating the sadness, on detection of 'being hit'. If the scale command, for example, the sound scale language, is used, the robot apparatus utters, e.g., 'pi-ro-li' as an action corresponding to recognition of the scale command.

By the stimuli from outside by contact, or by the sound scale command, the action of the robot apparatus is affected, such as to enable the interaction between the user and the robot apparatus.

Meanwhile, the actions of the conventional robot apparatus are merely determined by its own emotion or by the information afforded by the user. If plural robot apparatus can interact with one another by way of communication, and if the plural robot apparatus can react to one another and operate accordingly, the entertainment character of the robot apparatus will be improved further.

Moreover, if it is desirable for the plural robot apparatus to have a dialog with one another, it may be an occurrence that the plural robot apparatus are not of the same machine type. For example, one of the robot apparatus may be apparatus of an original model, while another may be the product of a generic model, or the plural robot apparatus may be furnished by different manufacturers. In such case, it is difficult for the robot apparatus to react to one another.

The robot apparatus of the generic model may be afforded with the functions of the robot apparatus of the original model. In other words, there are occasions where the robot apparatus of the original model are not afforded with the function owned by the robot apparatus of the generic model. Thus, there are occasions where the interaction function is limited to the robot apparatus of the same machine type.

However, the entertainment character of the robot apparatus can be enhanced by enabling the interaction between plural robot apparatus having different interaction functions. Additionally, it may be said that such interaction among various robot apparatus lends itself to effective utilization of the robot apparatus as resources.

DISCLOSURE OF THE INVENTION

In view of the above-described status of the art, it is an object of the present invention to provide a robot apparatus that can have a dialog with other robot apparatus, a method for controlling the action of the robot apparatus and a system for controlling the robot apparatus.

For accomplishing the above object, the robot apparatus according to the present invention includes an action part, action detection means for detecting the information contained in an action output by another robot apparatus, action part control means for controlling the action part, based on the information detected by the action detection means, and means for measuring the number of times of reactions of the other robot apparatus corresponding to the actions output by the action part. The action part control means outputs an action by the action part depending on the number of times of reactions of the other robot apparatus.

The robot apparatus, constructed as described above, detects the information contained in the action output by other robot apparatus, by action detection means, and controls the action part by action part controlling means to output an action. At this time, the action part controlling means controls the action part responsive to the number of times of reactions of the other robot apparatus as measured by the means for measuring the number of times of reactions. This permits the robot apparatus to act responsive to the action of the other robot apparatus.

For accomplishing the above object, the robot apparatus according to the present invention also includes action detection means for detecting the information contained in an action output by another robot apparatus and action outputting means for outputting an action corresponding to the information as detected by the action detection means.

The robot apparatus, constructed as described above, detects the information contained in the action output by the other robot apparatus to output the action corresponding to the information detected by the action detection means to output the action corresponding to the information as detected by the action detection means by the action outputting means. This permits the robot apparatus to act responsive to the action of the other robot apparatus.

For accomplishing the above object, an action controlling method for the robot apparatus including an action part according to the present invention includes an action detection step of detecting the information contained in an action output by another robot apparatus, an action part controlling step of controlling the action part, based on the information detected by the action detections step, and a step of measuring the number of times of reactions of the other robot apparatus based on the actions output by the action part. The action part controlling step outputs an action by the action part depending on the number of times of reactions of the other robot apparatus. This permits the robot apparatus to act responsive to the action of the other robot apparatus.

For accomplishing the above object, the action controlling method for the robot apparatus according to the present invention includes an action detection step of detecting the information contained in an action output by another robot apparatus and an action outputting step of causing one of the robot apparatus to output an action corresponding to the information as detected by the action detection step.

For accomplishing the above object, an action controlling system for the robot apparatus according to the present invention includes a plurality of robot apparatus including action detection means for detecting the information contained in an action output by the counterpart robot apparatus, and action outputting means for outputting an action corresponding to the information detected by the action detection means.

With this action controlling system for the robot apparatus, the robot apparatus detects the information contained in the action output by the counterpart robot apparatus by action detection means to output the action corresponding to the information as detected by the action detection means by the action outputting means. This action controlling system for the robot apparatus permits the robot apparatus to act responsive to the action of the robot apparatus.

For accomplishing the above object, an action controlling method for the robot apparatus according to the present invention includes an action outputting step of one of the robot apparatus outputting a preset action when one of the robot apparatus is at a preset state, and a reactive action outputting step of the other robot apparatus outputting an action corresponding to the preset action output by the one robot apparatus. This action controlling method for the robot apparatus permits the robot apparatus to act responsive to the action of the robot apparatus.

Other objects, features and advantages of the present invention will become more apparent from reading the embodiments of the present invention as shown in the drawings.

BRIEF DESCRIPTION OF THE DRAWINGS

FIG. 10 shows a status transition table provided for each node of the finite probability automaton.

FIG. 12 shows an illustrative structure of a database for sound scale commands provided on the robot apparatus.

BEST MODE FOR CARRYING OUT THE INVENTION

Figure 1:
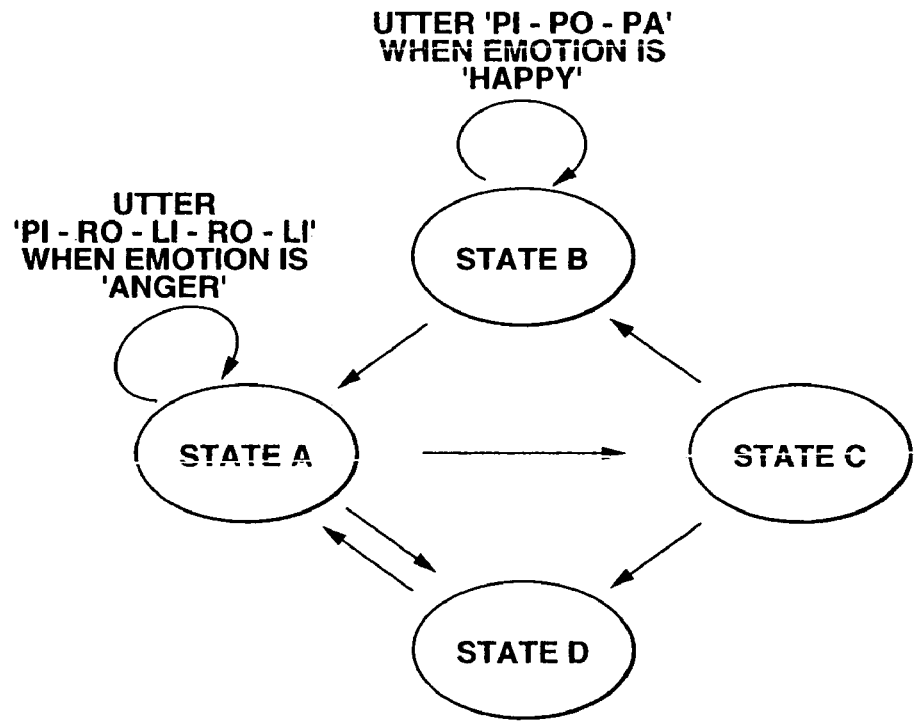
FIG. 1 illustrates a conventional robot apparatus designed for changing the pronunciation depending on the emotion.
Figure 2:
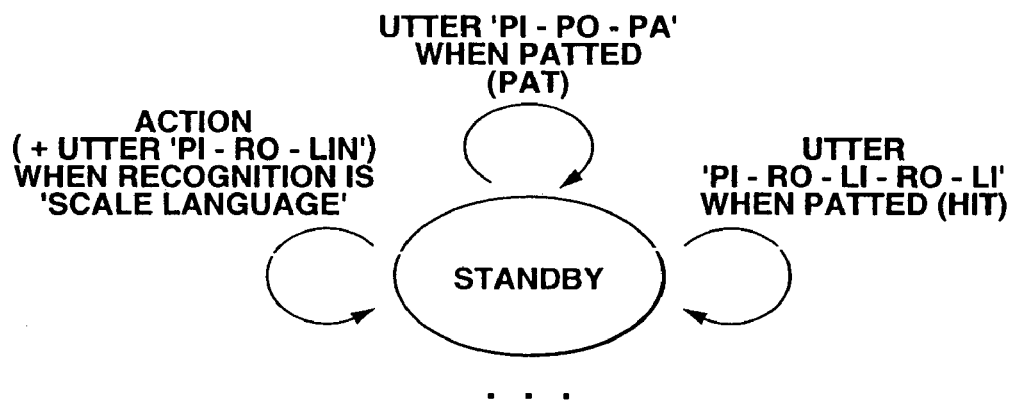
FIG. 2 illustrates a conventional robot apparatus which has its action controlled by, e.g., a scale command.

Referring to the drawings, a preferred embodiment of the present invention will be explained in detail. The present embodiment is directed to an autonomous robot apparatus which acts autonomously responsive to the external information, ambient environment (or extraneous factors) or to internal states (or internal factors).

In the present embodiment, the structure of the robot apparatus is first explained and subsequently applying part of the present invention in the robot apparatus is explained in detail.

(1) Structure of Robot Apparatus of the Present Embodiment

Figure 3:
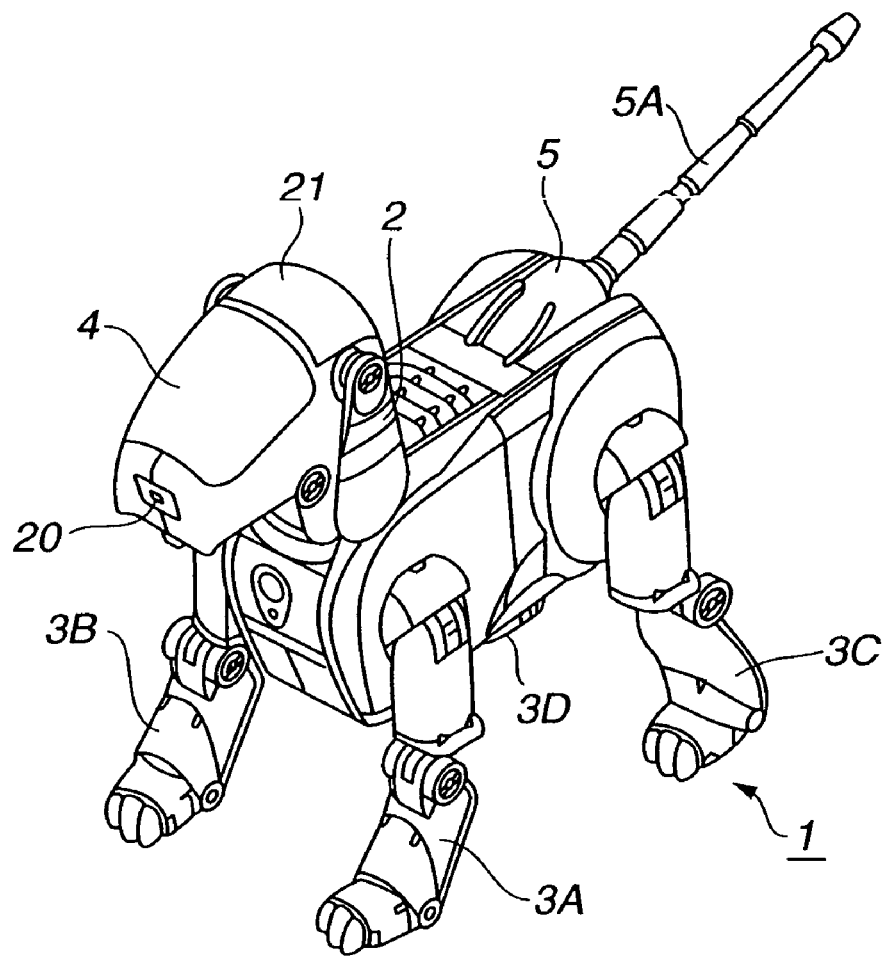
FIG. 3 is a perspective view showing the appearance of a robot apparatus embodying the present invention.

As shown in FIG. 3, the robot apparatus is a so-called pet robot, simulating an animal, such as a 'dog', and is constructed by leg units 3A, 3B, 3C and 3D, connected on the front and rear sides on the left and right sides of a trunk unit 2, and by a head unit 4 and a tail unit 5, connected to the front and rear ends of the trunk unit 2, respectively.

Figure 4:
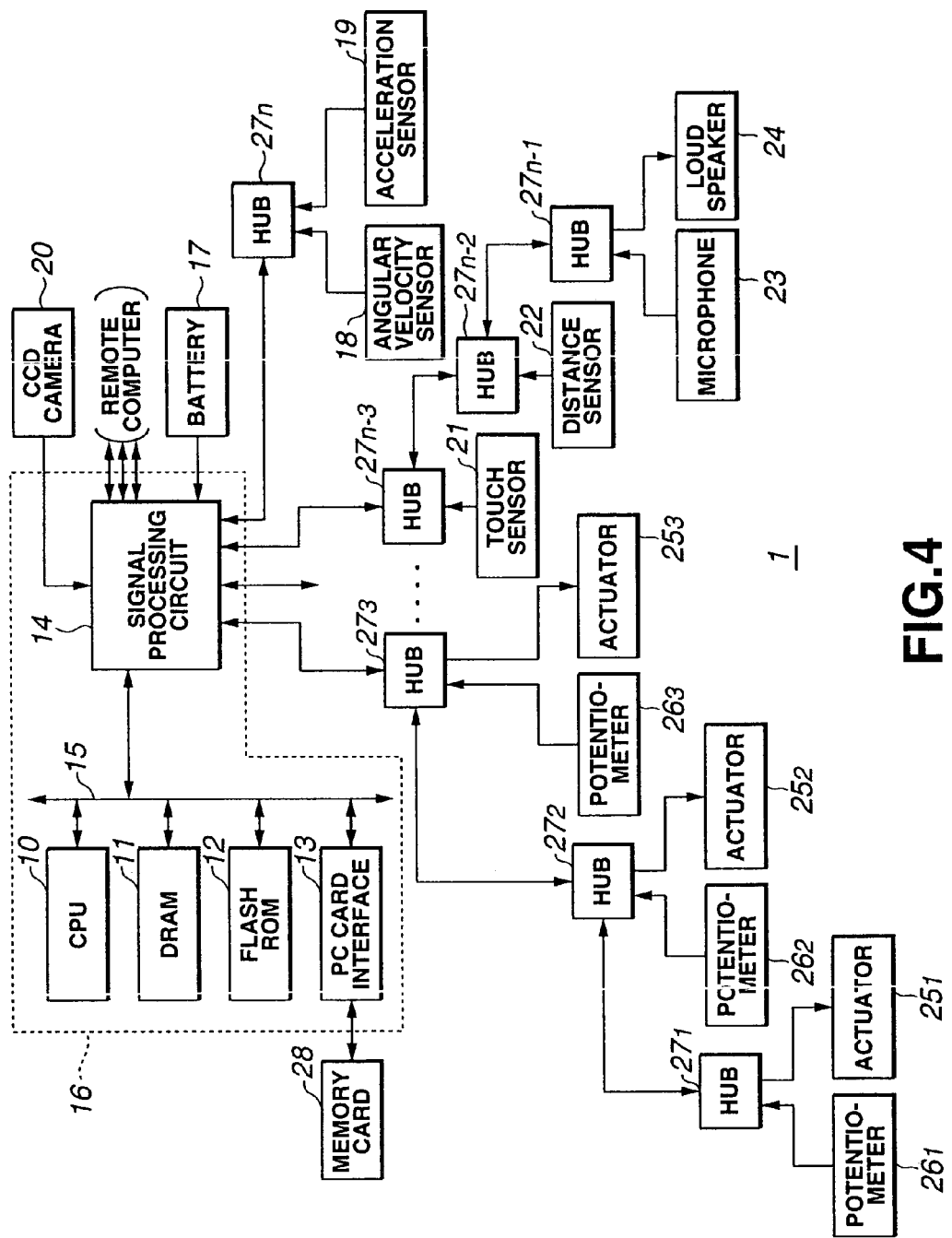
FIG. 4 is a block diagram showing a circuit structure of the robot apparatus.

Referring to FIG. 4, the trunk unit 2 includes a controller unit 1.6, comprised of an interconnection over an internal bus 15 of a CPU (central processing unit) 10, a DRAM (dynamic random access memory) 11, a flash ROM (read-only memory) 12, a PC (personal computer) card interface circuit 13 and a signal processing circuit 14, and a battery 17 as a power supply for the robot apparatus 1. In the trunk unit 2 are also housed an angular velocity sensor 18 and an acceleration sensor 19 for detecting the posture and the acceleration of movement of the robot apparatus 1.

On the head unit 4, there are mounted, in position, a CCD (charge coupled device) camera 20 for imaging an outside state, a touch sensor 21, for detecting the pressure resulting from a physical action, such as 'stroking' or 'patting' from the user, a distance sensor 22 for measuring the distance to an object positioned ahead, a microphone 23 for collecting the external sound, a loudspeaker 24 for outputting the sound, like whining, and LEDs (light emitting diodes) equivalent to the 'eyes' of the robot apparatus 1.

The joint portions of the leg units 3A to 3D, connecting portions of the leg units 3A to 3D and the trunk unit 2, connecting portions of the head unit 4 and the trunk unit 2 and the connecting portion of a tail 5A of the tail unit 5 are provided with a number of actuators $25_1$ to $25_n$ and potentiometers $26_1$ to $26_n$ corresponding to the number of the degrees of freedom. For example, the actuators $25_1$ to $25_n$ include servo motors. The leg units 3A to 3D are controlled by the driving of the servo motors to transfer to a targeted posture or movement.

The sensors, such as the angular velocity sensor 18, acceleration sensor 19, touch sensor 21, floor contact sensors 23R/L, posture sensor 24, distance sensor 25, microphone 26, distance sensor 22, microphone 23, loudspeaker 24 and the potentiometers $25_1$ to $25_n$ are connected via associated hubs $27_1$ to $27_n$ to the signal processing circuit 14 of the controller 16, while the CCD camera 20 and the battery 17 are connected directly to the signal processing circuit 14.

The signal processing circuit 14 sequentially captures sensor data, picture data or speech data, furnished from the above-mentioned respective sensors, to cause the data to be sequentially stored over internal bus 15 in preset locations in the DRAM 11. In addition, the signal processing circuit 14 sequentially captures residual battery capacity data indicating the residual battery capacity supplied from the battery 17 to store the data thus captured in preset locations in the DRAM 11.

The respective sensor data, picture data, speech data and the residual battery capacity data, thus stored in the DRAM 11, are subsequently utilized when the CPU 10 performs actional control of the robot apparatus 1.

In actuality, in an initial stage of power up of the robot apparatus 1, the CPU 10 reads out a memory card 28 loaded in a PC card slot, not shown, of the trunk unit 2, or a control program stored in the flash ROM 12, either directly or through a PC card interface circuit 13, for storage in the DRAM 11.

The CPU 10 then checks its own status and surrounding statuses, and the possible presence of commands or actions from the user, based on the sensor data, picture data, speech data or residual battery capacity data, sequentially stored from the signal processing circuit 14 to the DRAM 11.

The CPU 10 also determines the next ensuing actions, based on the verified results and on the control program stored in the DRAM 11, while driving the actuators $25_1$ to $25_n$, as necessary, based on the so determined results, to produce behaviors, such as swinging the head unit 4 in the up-and-down direction or in the left-and-right direction, or moving the leg units 3A to 3D for walking or jumping.

The CPU 10 generates speech data as necessary and sends the so generated data through the signal processing circuit 14 as speech signals to the loudspeaker 24 to output the speech derived from the speech signals to outside or turns on/off or flicker the LEDs.

In this manner, the present robot apparatus 1 is able to behave autonomously responsive to its own status and surrounding statuses, or to commands or actions from the user.

(2) Software Structure of Control Program

Figure 5:
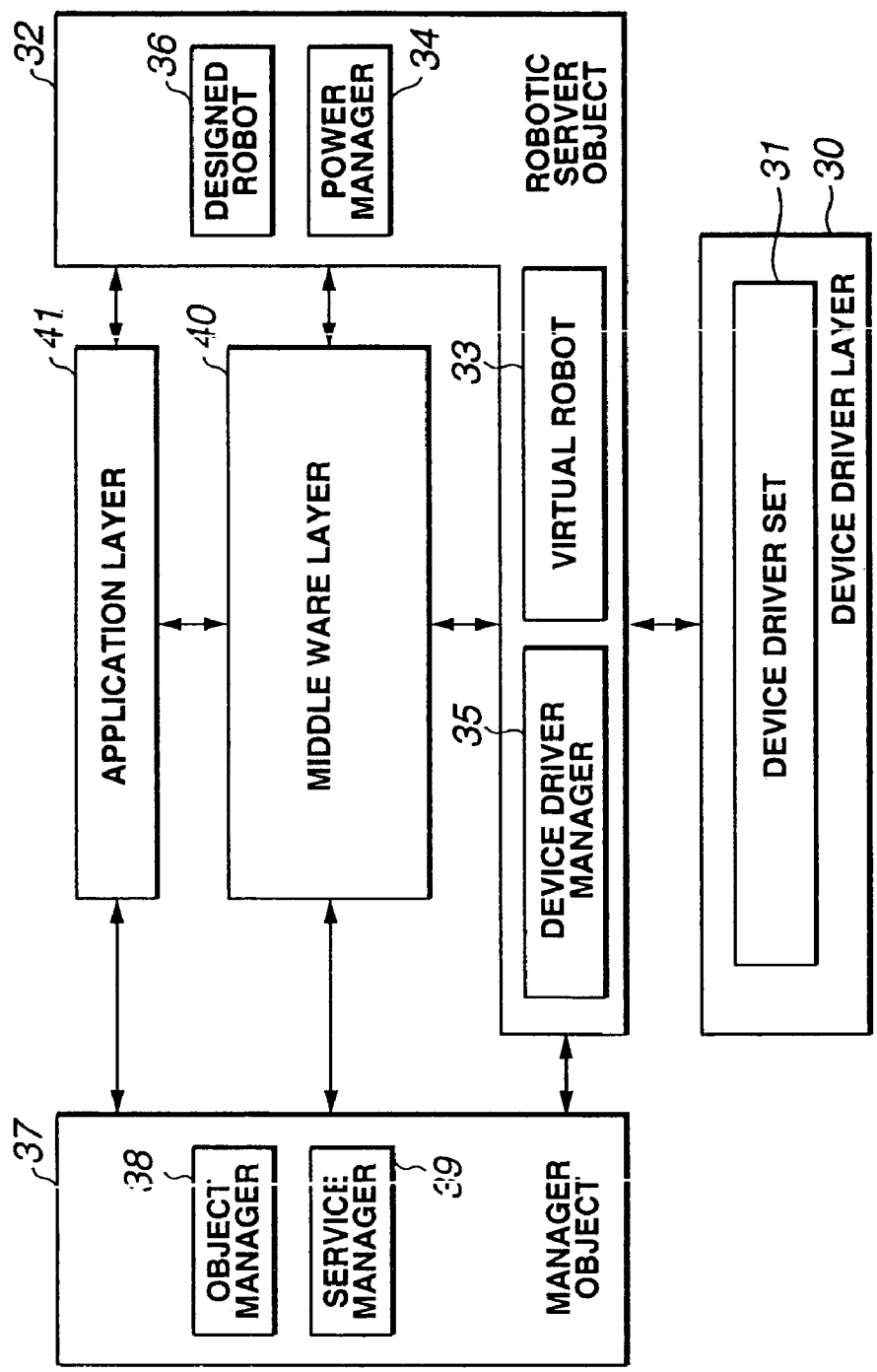
FIG. 5 is a block diagram showing a software structure of the robot apparatus.

FIG. 5 shows the software structure of the above-mentioned control program in the robot apparatus 1. In FIG. 5, a device driver layer 30 is positioned in the lowermost layer of the control program, and is formed as a device driver set 31 made up by plural device drivers. Each device driver is an object allowed to directly access the hardware used in a routine computer, such as an CCD camera 20 (FIG. 4) or a timer, and performs processing responsive to interruption from an associated hardware.

A robotics server object 32 is made up by a virtual robot 33, a power manager 34, comprised of a set of software items responsible for switching between power sources, a device driver manager 35, comprised of a set of software items, supervising various other device drivers, and a designed robot 36, comprised of a set of software items supervising the mechanism of the robot apparatus 1. The virtual robot 33, located in the lowermost layer of the device driver layer 30, is comprised of a set of software items furnishing an interface for accessing the hardware items, including the above-mentioned various sensors and actuators $25_1$ to $25_n$.

A manager object 37 is made up by an object manager 38 and a service manager 39. The object manager 38 is a set of software items supervising the booting and the end of respective software items included in the robotics server object 32, a middle ware layer 40 and an application layer 41, while the service manager 39 is a set of software items supervising the connection to respective objects based on the information on the connection among respective objects stated in a connection file stored in a memory card 28 (FIG. 4).

The middle ware layer 40 is positioned as an upper layer of the robotics server object 32, and is made up by a set of software items providing basic functions of the robot apparatus 1, such as picture processing or speech processing. The application layer 41 is located as an upper layer of the middle ware layer 40, and is a set of software items for deciding on the behavior of the robot apparatus 1 based on the results of the processing by the software items making up the middle ware layer 40.

Figure 6:
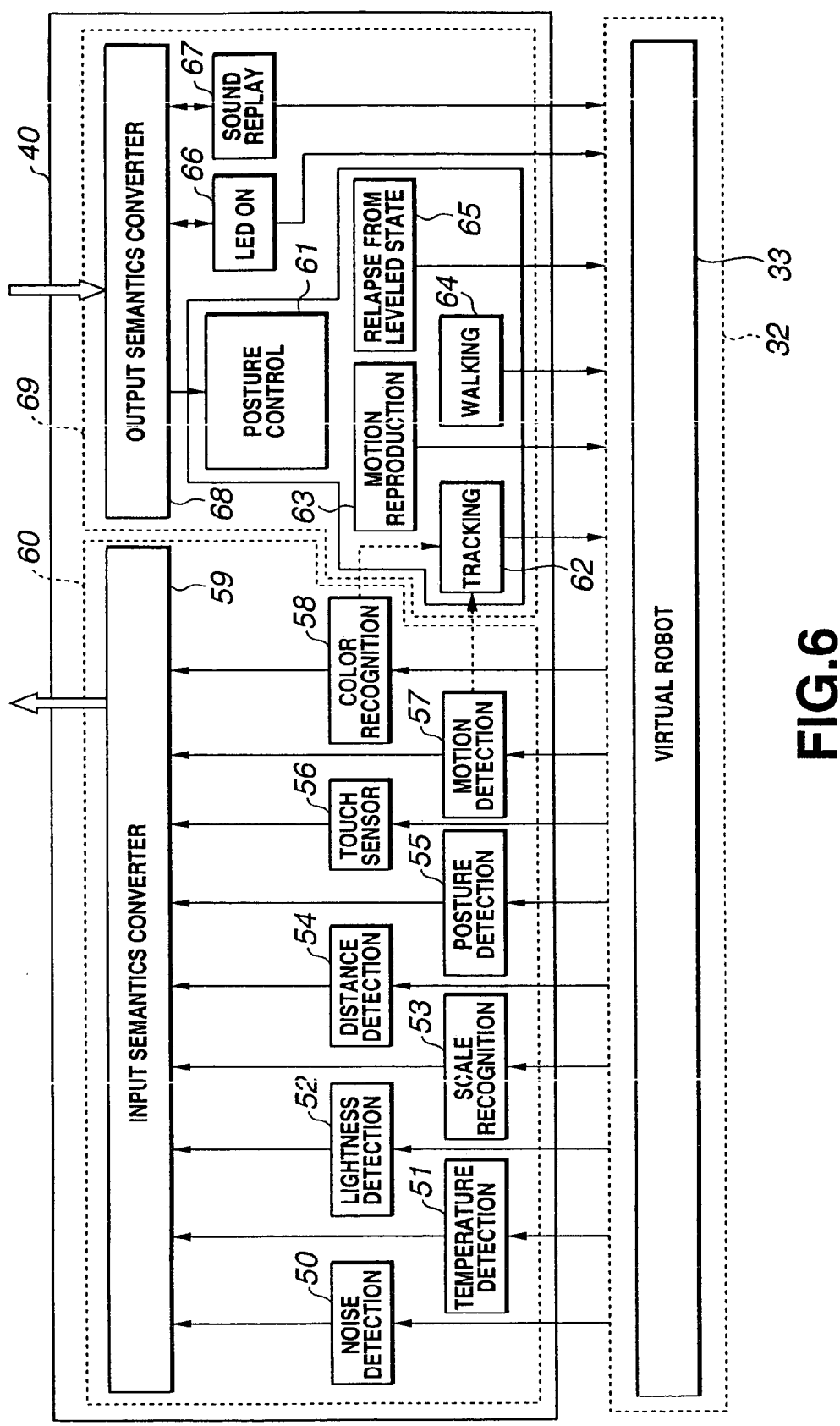
FIG. 6 is a block diagram showing the structure of a middle ware layer in the software structure of the robot apparatus.
Figure 7:
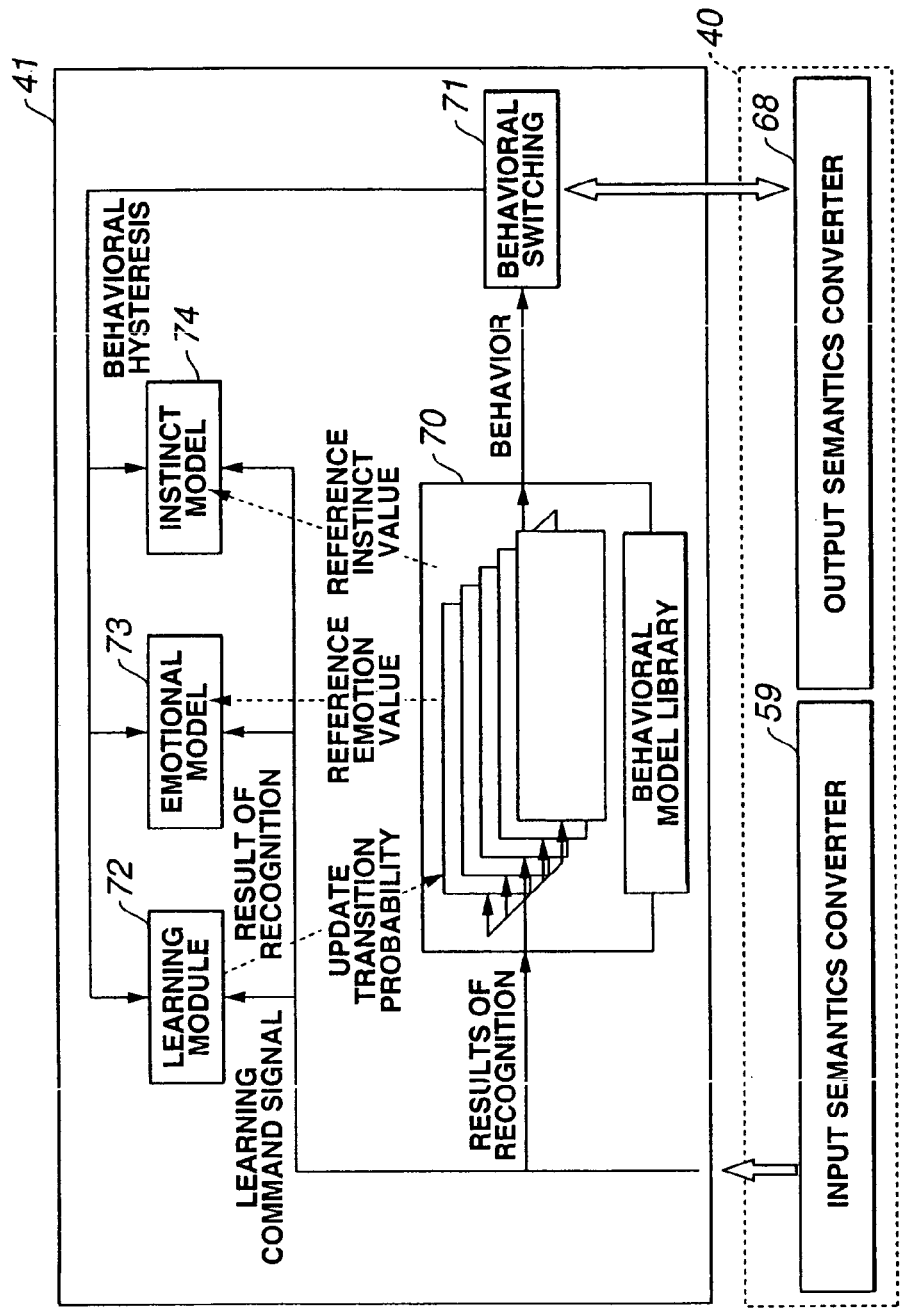
FIG. 7 is a block diagram showing the structure of an application layer in the software structure of the robot apparatus.

FIG. 6 and FIG. 7 shows specified software structures of the middle ware layer 40 and the application layer 41.

Referring to FIG. 6, the middle ware layer 40 is made up by a recognition system 60, having signal processing modules 50 to 58 for noise—, temperature—or lightness detection, sound scale recognition, distance—or posture detection, for a touch sensor, for motion detection and for color recognition, and an input semantics converter module 68, and by an outputting system 69, having an output semantics converter module 68 and signal processing modules 61 to 67 for posture management, tracking, motion reproduction, walking, restoration from the falldown state, LED lighting and for sound reproduction.

The signal processing modules 50 to 58 of the recognition system 60 captures relevant data from the sensor data, picture data and the speech data, read out by the virtual robot 33 of the robotics server object 32 from the DRAM 11 (FIG. 4) to process the data and routes the processed results to the input semantics converter module 59. It is noted that the virtual robot 33 is constructed as a component for exchanging or converting signals in accordance with a preset communication protocol.

The input semantics converter module 59 recognizes the own status, the surrounding status, user's commands or actions, such as 'annoying', 'sultry', 'light', 'a ball has been detected', 'falldown is detected', 'stroked', 'patted', 'do-mi-so scale has been heard', 'a moving object has been detected', or 'an obstacle has been detected' to output the results of recognition to the application layer 41 (FIG. 5).

The application layer 41 is made up by five modules, namely a behavioral model library 70, a behavioral switching module 71, a learning module 72, a emotional model 73 and an instinct model 74, as shown in FIG. 7.

Figure 8:
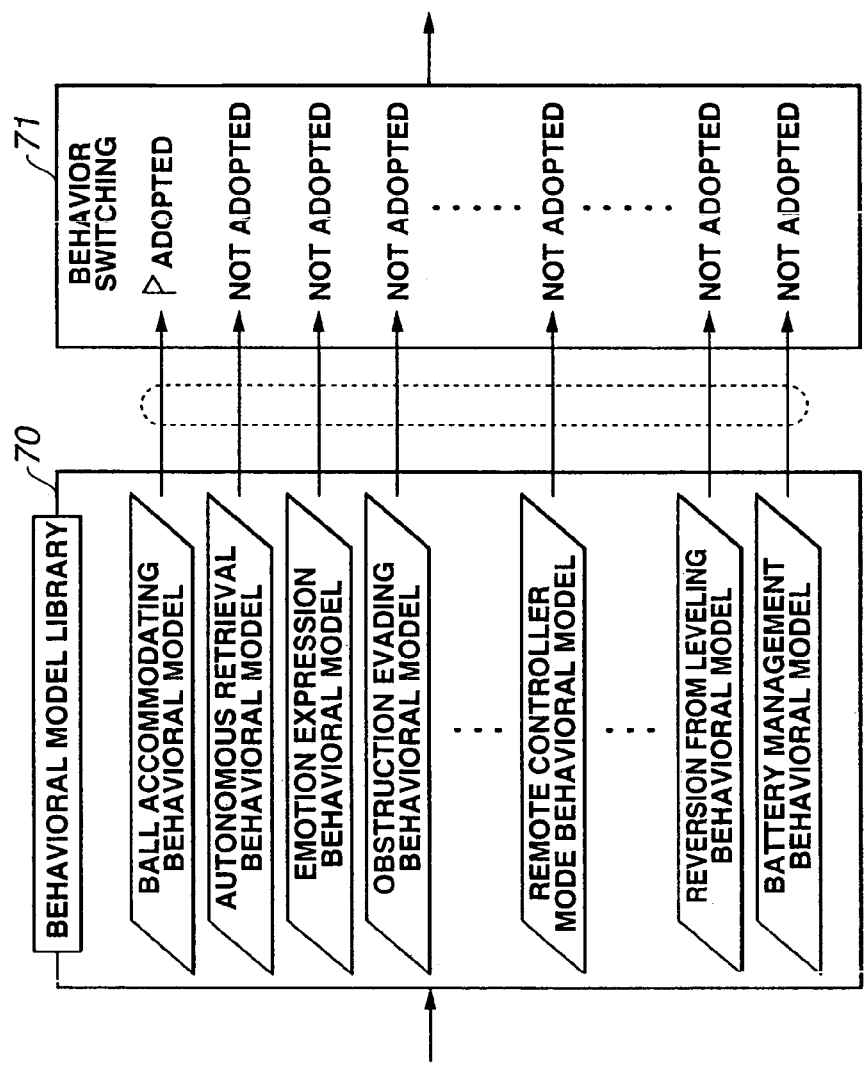
FIG. 8 is a block diagram showing the structure of a behavioral model library of the application layer.
Figure 9:
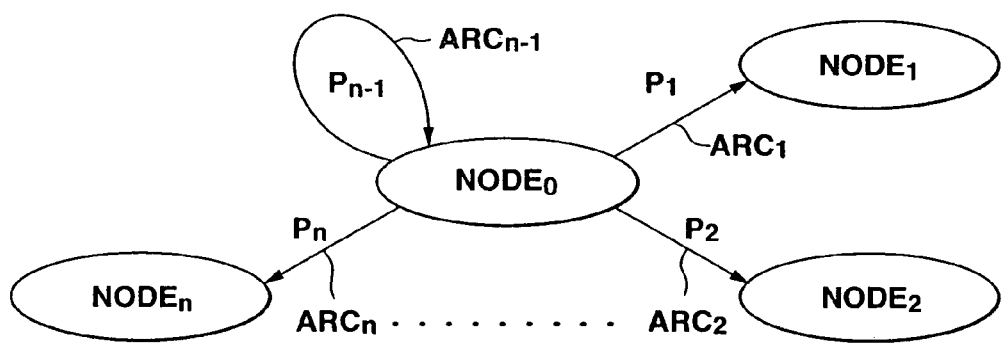
FIG. 9 illustrates a finite probability automaton as the information for behavior decision for the robot apparatus.

In the behavioral model library 70 there are provided respective independent behavioral models $70_1$ to $70_n$ in association with plural pre-selected condition items, such as 'residual battery capacity is small', 'restoration from the falldown state', 'an obstacle is to be evaded', 'the emotion is to be expressed' or 'a ball has been detected', as shown in FIG. 8.

When the results of recognition are provided from the input semantics converter module 59 or a preset time has elapsed as from the time the last results of recognition were provided, the behavioral models $70_1$ to $70_n$ decide on the next behaviors, as they refer to parameter values of the emotion as held by the emotional model 73 and to parameter values of the corresponding desires as held by the instinct model 74, to send the results of decision to the behavioral switching module 71.

In the present embodiment, the behavioral models $70_1$ to $70_n$ use an algorithm, termed finite probability automaton, as a technique of deciding on the next behavior. This algorithm probabilistically determines from which one of the nodes (states) $NODE_0$ to $NODE_n$ to which one of these nodes $NODE_0$ to $NODE_n$ transition is to be made, based on the values of the transition probability $P_1$ to $P_n$ as set for the arcs $ARC_1$ to $ARC_n$ interconnecting the respective nodes $NODE_0$ to $NODE_n$.

Specifically, each of the behavioral models $70_1$ to $70_n$ includes a status transition table 80, shown in FIG. 10, for each of the nodes $NODE_0$ to $NODE_n$, forming the own behavioral models $70_1$ to $70_n$, in association with these nodes $NODE_0$ to $NODE_n$.

In the status transition table 80, input events (results of recognition), as the conditions for transition in the nodes $NODE_0$ to $NODE_n$, are listed in the column of the 'input event name', in the priority order, and further conditions for the transition condition are stated in associated rows of the columns 'data name' and 'data range'.

Thus, in the node $NODE_{100}$, shown in the status transition table 80 of FIG. 10, given the results of recognition 'ball has been detected' (BALL), the ball size (SIZE) being 'from 0 to 1000', as given along with the results of recognition, represents a condition for transition to another node. Similarly, given the results of recognition 'an obstacle has been detected' (OBSTACLE), the distance (DISTANCE) to the obstacle being in a range 'from 0 to 100', as given along with the results of recognition, represents a condition for transition to another node.

Also, in the present node $NODE_{100}$, if no results of recognition are input, but any one of the parameter values 'joy' (JOY), surprise (SURPRISE) or 'sadness' (SADNESS) among the parameter values of the respective emotion and desires, as held in the emotional model 73, among the parameter values periodically referenced by the behavioral models $70_1$ to $70_n$, is in a range between '50 and 100', transition may be made to another node.

Moreover, in the status transition table 80, the node names to which transition can be made from the node $NODE_0$ to $NODE_n$ are shown in the row 'nodes of destination of transition' in the column 'probability of transition to other nodes'. Additionally, the probability of the transition to other nodes $NODE_0$ to $NODE_n$, enabled when all conditions stated in the columns 'input event name', 'data name' and 'data range' are met, is entered in corresponding locations in the column 'probability of transition to other nodes'. The behaviors to be output on the occasion of transition to the nodes $NODE_0$ to $NODE_n$ are indicated in the row 'output behavior' in the column 'probability of transition to other nodes'. Meanwhile, the sum of the probability values of each row in the column 'probability of transition to other nodes' is 100%.

Thus, in the node $NODE_{100}$ represented by the status transition table 80 of FIG. 10, given the results of recognition that 'the ball has been detected' and that the size (SIZE) of the ball is in a range from '0 to 1000', transition to the 'node $NODE_{120}$ (node 120)' can be made with the probability of 30%, and the behavior 'ACTION 1' is then output.

In each of the behavioral models $70_1$ to $70_n$, a plural number of the sets of the nodes $NODE_0$ to $NODE_n$, each stated as this status transition table 80, are concatenated together, such that, given the results of recognition from the input semantics converter module 59, the next behavior is probabilistically determined by exploiting the status transition tables of the $NODE_0$ to $NODE_n$ and the results of the decision are output to the behavioral switching module 71.

The behavioral switching module 71, shown in FIG. 7, sends to the output semantics converter module 68 of the middle ware layer 40 a command to select the behavior output from one of the behavioral models $70_1$ to $70_n$, having a preset high priority order, among the behaviors output from the respective behavioral models $70_1$ to $70_n$ of the behavioral model library 70, and to execute the behavior. This command is referred to below as a behavioral command. In the present embodiment, the order of priority of a given one of the behavioral models $70_1$ to $70_n$ shown in FIG. 8 is the higher the lower the rank of the behavioral model in question in FIG. 8.

The behavioral switching module 71 notifies the learning module 72, emotional model 73 and the instinct model 74 of the effect of the termination of the behavior, based on the behavior completion information afforded from the output semantics converter module 68 after the end of the behavior.

The learning module 72 is fed with the results of recognition of the instructions received as an action from a user, such as 'patting' or 'stroking', from among the results of recognition provided from the input semantics converter module 59.

The learning module 72 changes the probability of transition of the behavioral models $70_1$ to $70_n$ in the behavioral model library 70, based on the results of recognition and on the notification from the behavioral switching module 71, such that, when the action is 'patting' ('scolding') or 'stroking' ('praising'), the probability of occurrence of the behavior in question will be increased or decreased, respectively.

On the other hand, the emotional model 73 is holding parameters representing the intensity of each of the six emotion types, namely joy (JOY), sadness (SADNESS), anger (ANGER), surprise (SURPRISE), disgust (DIS- GUST) and fear (FEAR). The emotional model 73 periodically updates the parameter values of these emotion types, based on the particular results of recognition provided by the input semantics converter module 59, such as 'patted' or 'stroked', time elapsed and on the notification from the behavioral switching module 71.

Specifically, the emotional model 73 calculates a parameter value E[t+1] of the current emotion type for the next period in accordance with the following equation (1):

$$E[t+1]=E[t]+ke \times \Delta E[t] \qquad (1)$$

where ΔE[t] in the amount of variation of the emotion type as calculated by a preset equation based on, for example, the results of recognition provided by the input semantics converter module 59, the behavior of the robot apparatus 1 at the pertinent time or on the time elapsed as from the previous updating event, E[t] is the current parameter value of the emotional type and ke is a coefficient representing the sensitivity of the emotion type. The emotional model 73 substitutes the so calculated value for the current parameter value E[t] of the emotion type to update the parameter value of the emotion type. In similar manner, the emotional model 73 updates the parameter values of the totality of the emotion types.

Which effect the respective results of recognition and the notification from the output semantics converter module 68 will have on the variation of the parameter values of the respective emotion types ΔE[t] is predetermined, such that the results of recognition 'patted' significantly affects the amount of variation ΔE[t] of the parameter value of the emotion type 'anger', while the results of recognition 'patted' significantly affects the amount of variation ΔE[t] of the parameter value of the emotion type 'joy'.

The notification from the output semantics converter module 68 is the so-called behavior feedback information (behavior end information) and the information concerning the results of occurrence of the behavior. The emotional model 73 also changes the emotion based on this information. For example, the level of the emotion of anger may be lowered by the act of 'barking'. Meanwhile, the notification from the output semantics converter module 68 is also input to the learning module 72, which then changes the corresponding transition probability of the behavioral models $70_1$ to $70_n$ based on this notification.

Meanwhile, the feedback of the results of the behavior may be made by an output of the behavioral switching module 71 (behavior seasoned with the emotion).

On the other hand, the instinct model 74 holds the parameters, representing the intensity of four reciprocally independent desires, namely 'desire for exercise' 'desire for affection', 'appetite' and 'curiosity'. The instinct model 74 periodically updates the parameter values of these desires, based on the results of recognition provided from the input semantics converter module 59, time elapsed and on the notification from the behavioral switching module 71.

Specifically, as concerns the 'desire for exercise', 'desire for affection' and 'curiosity', the instinct model 74 calculates, at a preset period, the parameter value I [k+1] of these desires at the next period, using the following equation (2):

$$I[k+1]=I[k]+ki \times \Delta I[k] \qquad (2)$$

where ΔI[k] is the amount of variation of the desire in question at a pertinent time as calculated by a preset equation based on the results of recognition, time elapsed and the notification of the output semantics converter module 68, I[k] is the current parameter value of the desire and ki is the coefficient representing the sensitivity of the desire in question, and substitutes the calculated results for the current parameter value I[k] to update the parameter value of the desire. The instinct model 74 updates the parameter values of the respective desires except the 'appetite'.

The effect of the results of recognition and the notification from the output semantics converter module 68 on the amount of variation ΔI[k] of the parameter values of the respective desires is predetermined, such that, for example, the notification from the output semantics converter module 68 significantly affects the amount of variation ΔI[k] of the parameter values of 'fatigue'.

In the present embodiment, the parameters of the respective emotion types and the respective desires (instincts) are varied in a range from 0 to 100, while the values of the coefficients ke and ki are also set individually for the respective emotion types and for respective desires.

The output semantics converter module 68 of the middle ware layer 40 sends abstract behavioral commands, such as 'go ahead', 'joy', 'cry', or 'tracking (track a ball)', provided by the behavioral switching module 71 of the application layer 41, as described above, to the signal processing modules 61 to 67 of the output system 69, as shown in FIG. 6.

Given a command for a behavior, the signal processing modules 61 to 67 generates servo command values to be supplied to the associated actuators $25_1$ to $25_n$ (FIG. 4) to execute the behavior, speech data of the sound to be output from the loudspeaker 24 (FIG. 4) and/or driving data to be supplied to the LED of the 'eye', based on the behavioral command, and send these data through the virtual robot 33 of the robotics server object 32 and the signal processing circuit 14 (FIG. 4) in this order to the associated actuators $25_1$ to $25_n$, loudspeaker 24 or to the LED.

Thus, the robot apparatus 1 is able to perform an autonomous behavior, based on the control program, responsive to its own internal state, surrounding state (exterior state) or to the command or action from the user.

In the following explanation, the structure of the robot apparatus is first explained, and the portion thereof pertinent to the present invention is then explained.

(3) Structure Realized by the Application of the Present Invention

By the application of the present invention, the robot apparatus, having the above structure, is able to operate responsive to the action of another robot apparatus. This enables the plural robot apparatus to have dialog with one another. Moreover, the robot apparatus may have a dialog with another robot apparatus having a different dialog function. First, the robot apparatus of the present invention, according to the present invention, capable of having a dialog with the robot apparatus of the different dialog function, is first explained, and the robot apparatus according to the present invention, capable of having a dialog based on the same dialog function, is subsequently explained.

(3-1) Robot Apparatus Having a Dialog with a Robot Apparatus Having a Different Dialog Function The robot apparatus according to the present invention is able to have a dialog with another robot apparatus having a different dialog function.

The robot apparatus having a different dialog function may be exemplified by a robot apparatus of a different machine type, a robot apparatus furnished from a different manufacturer and a robot apparatus produced by the same manufacturer but different in type number or model. In the present embodiment, explanation is made under an assumption that a dialog is to be had with another robot apparatus which has its dialog function controlled by the sound scale command. In this case, the other robot apparatus, as a counterpart of the dialog, utters, e.g., 'pi-ro-lin', in its standby state, as a preset action, on recognition of the scale command composed of scale sounds.

By the robot apparatus of the present embodiment of the present invention having such sound scale command outputting function, and reacting, such as by a synchronous action, to the action of another robot apparatus, having its action controlled by the sound scale command, the user is in a position of appreciating the actions, produced as a result of reactions between the robot apparatus, as the dialog being had by the robot apparatus.

The robot apparatus of the present embodiment realizes the dialog with the other robot apparatus in a manner which will be clarified in the following explanation. In this explanation, the robot apparatus of the present embodiment is termed a main robot apparatus and the robot apparatus having the dialog function different from that of the main robot apparatus is termed a slave robot apparatus.

The main robot apparatus includes action detection means for detecting the information contained in the actions output by the slave robot apparatus as the other robot apparatus, and action outputting means for outputting an action corresponding to the information as detected by the action detection means. Specifically, the main robot apparatus includes a CPU 10, as described above. Specifically, the CPU 10 implements the above means as an action detecting function of detecting the information contained in the action output by the slave robot apparatus and an action outputting function of outputting the action corresponding to the information as detected by the action detecting function. That is, the CPU 10 implements the above functions by a variety of signal processing modules.

The main robot apparatus also includes communication means for exchanging the information with the slave robot apparatus. The information here is that by the scale sound. Thus, the communication means realizes the information transmission/reception by a loudspeaker 24. The information is also the meaning information indicating the meaning of an action. For example, the information may be the information for the meaning of an action itself or the emotion contained in the action.

The main robot apparatus, having the above-described structure, realizes the dialog function with the slave robot apparatus by a sequence of processing actions such as a so-called dialog mode. Specifically, the main robot apparatus realizes the dialog function by one of the behavior models shown in FIG. 8, for example, a dialog behavior model.

Figure 11:
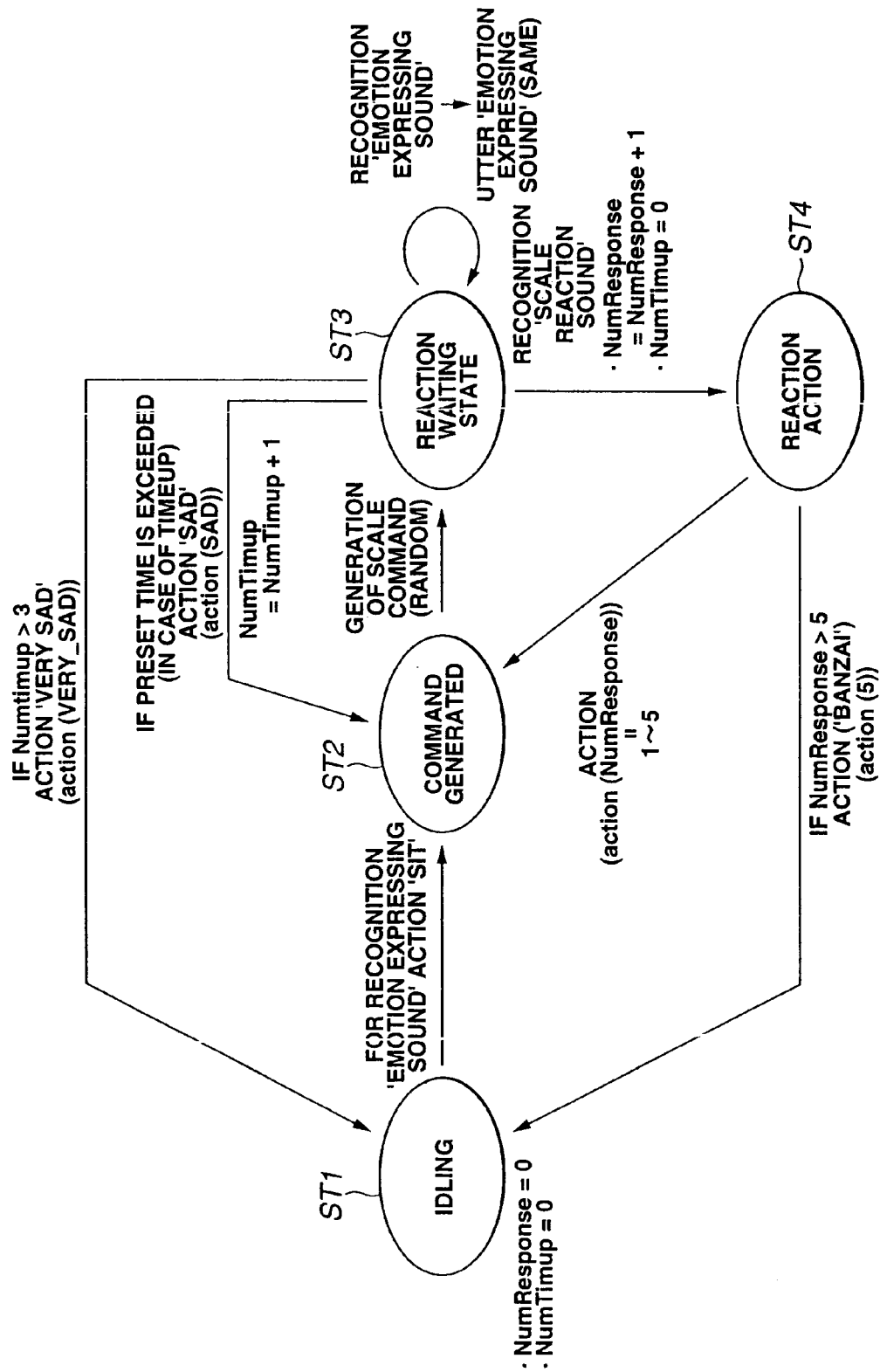
FIG. 11 illustrates a robot apparatus which enables the dialog with other robot apparatus having a different dialog function.

The main robot apparatus, having such function, recognizes the 'emotion expressing sound', such as 'pi-ro-lin', which is the sound signal issued from the slave robot apparatus in an idling state ST1, as shown in FIG. 11. By this, the main robot apparatus detects the presence of the slave robot apparatus and is thereby apprized of the slave robot apparatus being at a nearby position. This recognition indicates that the main robot apparatus is at a preset condition and is in a preset state ready for commencing or firing the dialog function (for example, the dialog behavior model).

The idling state ST1 is such a state in which the main robot apparatus is acting autonomously, that is a state on which the robot apparatus is acting autonomously depending on the external environment or responsive to its own emotional states.

On recognition of the emotion expressing sound, uttered by the slave robot apparatus, the main robot apparatus causes the slave robot apparatus to transfer to a 'sit' posture. It should be noted that the main robot apparatus does not necessarily have to cause the slave robot apparatus to transfer to the 'sit' posture but may cause the slave robot apparatus to transfer to other postures or to continue its autonomous behavior.

The main robot apparatus then causes the transfer to the command producing state ST2 to produce a sound scale command comprised of scale sounds. For example, the main robot apparatus generates the scale command as random.

Specifically, the main robot apparatus includes a database comprised of various sound scale commands. It should be noted that the various sound scale commands are associated with respective different action contents to be executed by the slave robot apparatus, with the scale sounds corresponding to different combinations of the sound names. The sound scale commands, forming the database owned by the main robot apparatus, are the sound scale commands owned by a so-called sound commander in order to control, e.g., the slave robot apparatus.

For example, the main robot apparatus includes a database made up by patterns of scale sounds of the sound scale command and by the command contents, as shown in FIG. 12. The command contents are action contents, such as uttering actions, performed by the slave robot apparatus on recognition of the corresponding sound scale patterns. Meanwhile, the commands implemented by the sound scale commands are not limited to the speech uttering actions, but may also be directed to, for example, posture changing actions.

The sound scale commands, owned in this manner by the main robot apparatus, may be registered during manufacture, but may also be subsequently registered anew or updated. The main robot apparatus selects the sound scale commands, owned as, e.g., a database, at random, and outputs the so selected sound scale command.

The main robot apparatus may also output the sound scale commands in association with actions. Usually, the sound scale commands are retained to be signal patterns for controlling the robot apparatus, and are handled as being meaningful for the robot apparatus. However, these commands are not meaningful, insofar as the human being is concerned. Thus, by causing the main robot apparatus to output the actions associated with the sound scale commands, the user is able to comprehend the meaning of the sound scale commands.

On outputting the sound scale command, the main robot apparatus enters into a state ST3 of waiting for reactions of a slave robot apparatus. The main robot apparatus maintains its reaction awaiting state ST3 for a preset time.

On recognition of the sound scale command, issued by the main robot apparatus, the slave robot apparatus outputs a emotion expressing sound, depending on the sound scale command. However, it is indefinite whether or not the slave robot apparatus necessarily responds to the sound scale command. The reason is that the slave robot apparatus may have gone away to some distant place by its own autonomous behavior or cannot detect the sound scale command due to, for example, ambient noise. In order to cope with this, the main robot apparatus provides for a variety of actions, responsive to reactions of the slave robot apparatus.

When the slave robot apparatus has output a emotion expressing sound, responsive to a sound scale command issued by the main robot apparatus, the latter recognizes this emotion expressing sound and outputs the same emotion expressing sound. For example, the main robot apparatus reads out and outputs the emotion expressing sound of the slave robot apparatus it holds as a database from the outset.

The user is able to appreciate the action performed between the main robot apparatus and the slave robot apparatus as the dialog between these robot apparatus.

On recognition of the emotion expressing sound (sound scale reaction sound), the main robot apparatus increments the variable NumResponse by one, while setting a variable NumTimup to zero. It should be noted that the variable NumResponse is a variable indicating the number of times of the reaction of the slave robot apparatus. This variable NumResponse is afforded with zero as an initial value when entering into the processing or mode of the dialog function. On the other hand, the variable NumTimup is a value indicating the number of times of failure of the slave robot apparatus to react to the sound scale command issued by the main robot apparatus. This value is referred to below as the number of times of non-reaction. For example, the failure of the slave robot apparatus to react to the command is decided on by the absence of the reaction from the slave robot apparatus for a preset time duration. This variable NumTimup is also afforded with zero as an initial value when entering into the processing or mode of the dialog function.

The emotion recognition by the slave robot apparatus is by providing a table showing the sound of the sound scale reaction and the corresponding emotion and by referring the detected sound scale reaction sound to the table. It is also possible not to provide such tables, in which case the emotion is to be recognized based on analyses of the pitch, power etc. of the detected sound of the sound scale reaction.

When the slave robot apparatus 1 has made reactions, the main robot apparatus performs preset actions as the next following reaction action.

The main robot apparatus performs the actions depending on the value of the above-mentioned NumResponse. The main robot apparatus uses this variable NumResponse as a variable for deciding on an action. Specifically, the main robot apparatus has various actions as action (1), action (2), action (3), . . . , and decides on one of them by the action (NumResponse) as an action on the slave robot apparatus.

The variable NumResponse indicates the number of times of reaction of the slave robot apparatus as recognized by the main robot apparatus. Thus, the larger this number, the larger is the number of times of reaction of the slave robot apparatus. By and large, a reaction to a person's action expressing his or her happy state, if any, gives him or her the happy emotion, as in case of chat or conversation. In this consideration, the actions of the action (1), action (2), action (3), . . . are defined so that the action indicating 'happiness' will be increasingly garish in this order.

In the state of reaction action ST4, the main robot apparatus selects the action (NumResponse), from the action as defined above, depending on the current variable NumResponse, to perform the action. That is, if the variable NumResponse is 1 to 5, the main robot apparatus causes the corresponding action (NumResponse) to be performed to transfer to the command issuing state ST2 again to select the sound scale command at random to output the so selected sound scale command. In the reaction awaiting state ST3, the main robot apparatus waits for the reaction from the slave robot apparatus. If the slave robot apparatus makes a reaction, the main robot apparatus causes a preset action to be performed again, responsive to the reactive action of the slave robot apparatus, to increment the variable NumResponse by 1, as an example. The main robot apparatus then performs an action indicating happiness which has become more garish responsive to the variable NumResponse incremented by 1.

When the variable NumResponse exceeds 5, the main robot apparatus performs the action of 'banzai' ('hurrah!'), as an action (6), to then revert to the idling state ST1. That is, the main robot apparatus completes the processing or mode for having dialog with the slave robot apparatus to then revert to a mode for autonomous behavior.

Thus, the main robot apparatus is responsive to the reaction from the slave robot apparatus to perform variable actions depending on the number of times of the reactions. The user is able to appreciate the actions exchanged between the main robot apparatus and the slave robot apparatus as the dialog between the robot apparatus.

It should be noted that the action of the main robot apparatus, indicating its 'happiness' is rendered increasingly garish with an increasing number of times of reactions from the slayer robot apparatus. This may be grasped as what may be called the action modulation.

If the reaction from the slave robot apparatus cannot be recognized within a preset time duration in the reaction awaiting state ST3, the main robot apparatus performs an action indicating 'sadness'. The robot apparatus also increments the variable NumTimUp, indicating the number of times of non-reaction, by 1. The case where there is no reaction from the slave robot apparatus may be such a case where the slave robot apparatus has gone away to some distant place by its own autonomous behavior or may also be such a case where the slave robot apparatus cannot detect the sound scale command due to, for example, ambient noise.

Meanwhile, even when the slave robot apparatus fails to make reactions, it is expressing the action indicating 'sadness'. It may be said that, in such case, the main robot apparatus recognizes the failure of the slave robot apparatus by a reaction action.

Lacking the reactions from the slave robot apparatus, the main robot apparatus performs the aforementioned action and again selects a sound scale command at random at the command issuing state ST2 to output the so selected sound scale command to wait again for the reaction from the slave robot apparatus in the reaction awaiting state St3. If, in this reaction awaiting state St3, the main robot apparatus has been unable to recognize the reactions from the slave robot apparatus for a preset number of times on end, that is if the number of times of non-reaction has reached a preset value, it performs an action of increased sadness. In the present instance, when the reaction from the slave robot apparatus cannot be recognized four times on end, that is if the variable NumTimUp, indicating the number of times of non-reaction, exceeds 3, the main robot apparatus performs the action indicating 'increased sadness' to then revert to the idling state ST1.

Thus, lacking the reaction from the slave robot apparatus, the main robot apparatus performs variable actions, depending on the number of times of non-reactions, whereby the user is able to appreciate the actions exchanged between the main and slave robot apparatus as the interaction between the robot apparatus.

Meanwhile, in the present embodiment, the case in which the action of 'increased sadness' is to be performed from the aforementioned reaction awaiting state ST3 is such a case where, in the reaction awaiting state ST3 to which the main robot apparatus transferred a plural number of times, the reaction from the slave robot apparatus has not been detected on end. It is because the variable NumTimUp indicating the number of times of non-reaction is initialized to zero when the slave robot apparatus has made response in the reaction awaiting state ST3. If, lacking a reaction from the slave robot apparatus to an action from the main robot apparatus, the slave robot apparatus has reacted to subsequent actions from the main robot apparatus, the main robot apparatus performs the action 'happiness' and initializes the variable NumTimUp, indicating the number of times of non-reaction, to zero.

The above-described processing is, of course, not limitative. For example, the number of times of non-reactions can be continuously counted without initializing the variable NumTimUp to zero responsive to reactions from the slave robot apparatus, that is, without dependency on whether there has been or has not been made a reaction.

Thus, the main robot apparatus is able to perform various actions, depending on the reacting actions of the slave robot apparatus to the actions from the main robot apparatus, inclusive of the non-reacting actions, and on the number of times of non-reactions. This renders it possible for the user to appreciate the actions performed as a result of reactions between the robot apparatus, as the dialog being made between the robot apparatus.

The main robot apparatus achieves this dialog by controlling an original model or a robot apparatus produced by another manufacturer, the action of which is controlled by the external control command, such as a sound scale command, in synchronism with its own actions. As a result, the user is able to appreciate the reacting actions between different models of the robot apparatus of the same manufacturer or between robot apparatus of different manufacturers as the dialog between the robot apparatus.

(3-2) Robot Apparatus Having a Dialog with the Same Dialog Function.

The dialog which is made on the basis of the dialog function between two robot apparatus, according to the present invention, is hereinafter explained. Each apparatus, explained here, has the same dialog function, which enables the two robot apparatus to have the dialog with each other.

Each robot apparatus includes action detection means for detecting the information contained in the action output by the counterpart robot apparatus, and action outputting means for outputting the actions corresponding to the information detected by the action detection means. Specifically, the main robot apparatus realizes this by its CPU as an action detecting function of detecting the information contained in the action output by the counterpart robot apparatus, and as an action outputting function of outputting the action corresponding to the information as detected by the action detection function. That is, the CPU 10 achieves these functions by a variety of signal processing modules.

Both robot apparatus are configured for outputting a preset action when in a preset state. Thus, when in a preset state, one of the robot apparatus outputs a preset action by the action outputting function, with the other robot apparatus outputting an action corresponding to the action output by the first-stated robot apparatus.

The two robot apparatus are of similar structure to each other to achieve the dialog with the counterpart robot apparatus. The dialog between the two robot apparatus is hereinafter explained with reference to FIG. 13.

Figure 13:
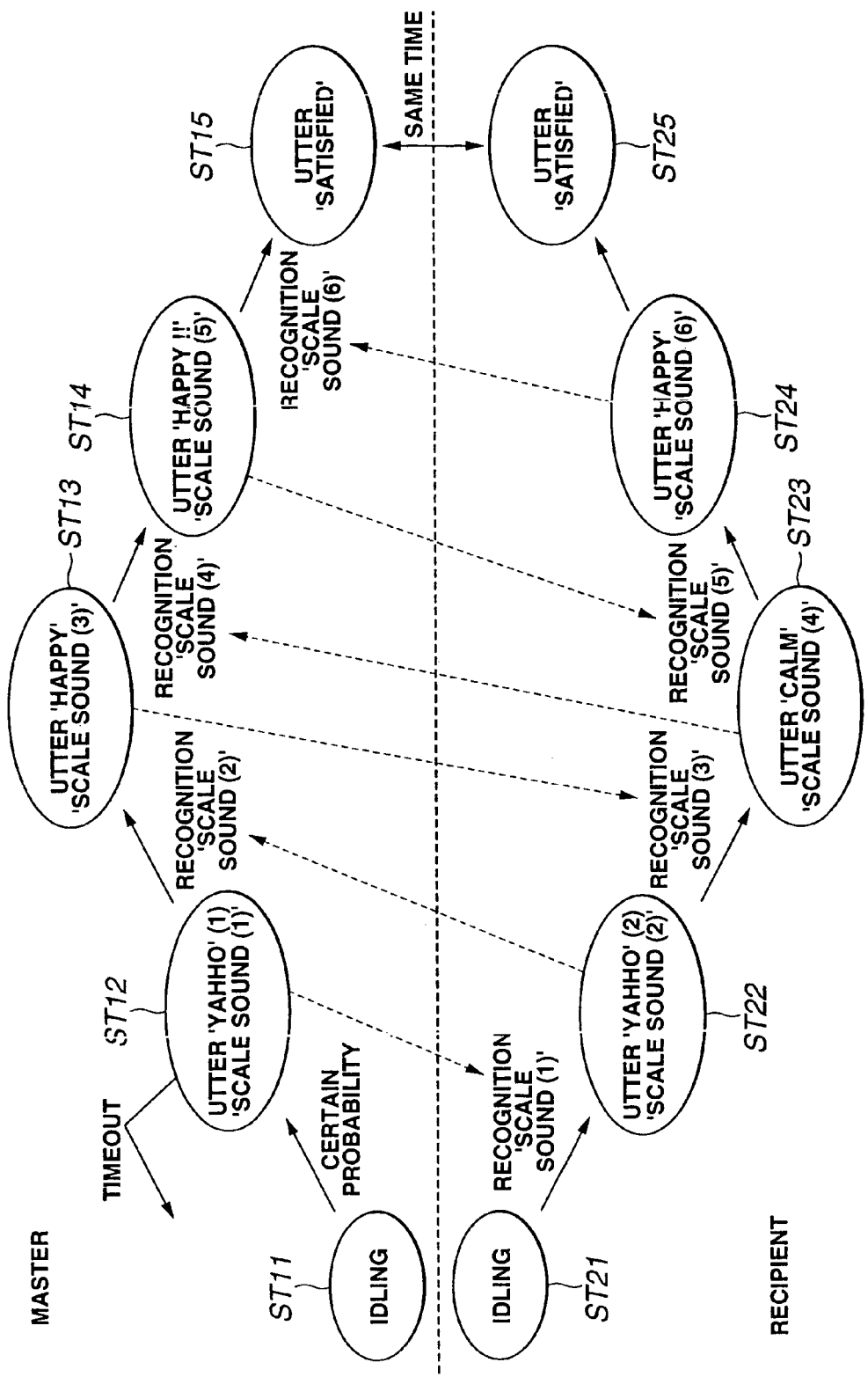
FIG. 13 illustrates a robot apparatus capable of having a dialog by the same dialog function.

Both of the robot apparatus are in the idling states ST11, ST21, as shown in FIG. 13. When in a preset state, one of the robot apparatus performs its action, whereby the dialog between the two robot apparatus commences. The robot apparatus being in the preset state herein means, for example, the robot apparatus being of a certain value of the probability or the level of the emotion, or the robot apparatus recognizing the existence of the other robot apparatus. The level of the emotion is the parameter value of the above-mentioned emotion. The robot apparatus being in this preset state may be detected by monitoring at a preset sampling interval. If the preset state cannot be detected at this sampling timing, the main robot apparatus may deem such state as timeout to revert to the idling state ST11. The robot apparatus which is in the preset state and first performed the action for the dialog is termed a 'master, with the other robot apparatus being termed a 'recipient'.

When in the preset state, each robot apparatus outputs a preset action. Thus, depending on the timing of being in the preset state, the 'other robot apparatus' may be a master, with the remaining robot apparatus being a recipient. That is, each of the robot apparatus may become a 'master' or a 'recipient' depending on circumstances.

The robot apparatus which has been the first to be in the preset state to start or fire the dialog function to become a master utters 'Yahhoo!' and the 'scale sound (1)', as an action ST12. It should be noted that the 'Yahhoo!' is the enunciation as the language, while the 'scale sound (1)' is the scale sound, such as 'pi-po-paa', that is no other than a sound sequence. In the following explanation, scale sounds (2), (3) and (4) . . . , are given as examples of the scale sounds. Each of these is of a different sound scale pattern. The scale sounds (2), (3) and (4) . . . , represent techniques established in the prior art as the sound scale commands.

Meanwhile, the scale sounds are output in association with the enunciation such as 'Yahhoo!' in such a case where the recipient robot apparatus as a counterpart of the dialog cannot recognize the language 'Yahhoo!' as the enunciation action as being meaningful. Thus, the scale sounds are not necessary if the robot apparatus is able to recognize the action as being meaningful. That is, it is when the action cannot be understood by the counterpart apparatus as being meaningful, that is when the enunciation as the action is a long text, that the scale sound is output simultaneously with the action. In such case, the scale sound operates as effective dialog means between the robot apparatus.

The recipient recognizes such enunciation of the master to transfer from an idling state ST21 to a reactive action ST22. That is, the recipient boots its dialog function, with the master's enunciation as a trigger.

The recipient enunciates 'Yahhoo!' and the scale sound (2)' as the reactive action ST22. The recipient recognizes the enunciation made by the master by the 'scale sound (1)' of the 'Yahhoo!' and the 'scale sound (1)' as enunciated by the master.

The scale sound is the technique already established as the sound scale command in the control robot apparatus, as described above. By the application of the scale sound recognition system, thus established, the robot apparatus 1 accurately recognizes the command through a scale sound pattern of the scale sounds.

The master recognizes the enunciation of the 'scale sound (2)' of the recipient and enunciates 'happy' and 'the sound (3)' as its reactive action ST13. The reactive actions to the action of the counterpart side are repeated as the contents of the reactive actions are changed.

That is, the recipient recognizes the enunciation of the 'scale sound (3)' of the master and utters 'calm' and 'the scale sound (4)' as the reactive action ST23. Meanwhile, 'calm' is the enunciation indicating the contents of, for example, 'be calm'. The master recognizes the enunciation of the 'scale sound (4)' and utters 'happy!' and 'the scale sound (5)' as its reactive action ST14. Meanwhile, 'happy!' is no more than the emphasized expression of 'happy'. The recipient recognizes the enunciation of the master of 'the scale sound (5)' to utter 'happy' and 'the scale sound (6)' as its reactive action ST24. The master then recognizes the enunciation of the 'scale sound (6)' of the recipient to utter 'satisfied' as the last action of the dialog action. In keeping therewith, the recipient similarly utters 'satisfied' in synchronism with the master's enunciation.

In this manner, the two robot apparatus, operating as a master and as a recipient, are able to react to the counterpart side's action, whereby the user is able to appreciate the action performed as a result of reaction between the robot apparatus as the dialog between the robot apparatus.

By exploiting the recognition system of the scale sound, established as the technique, the counterpart side's action can be recognized, as described above. This, of course, is not limitative, such that one of the robot apparatus is also able to directly recognize the meaningful language uttered by the robot apparatus, such as 'Yahhoo!', to take a reactive action, whereby the user is able to grasp the dialog by the robot apparatus as being more realistic dialog.

Lacking the reaction from the counterpart robot apparatus within a preset time, this state may be deemed to be a timeout state to revert again to idling.

Figure 14:
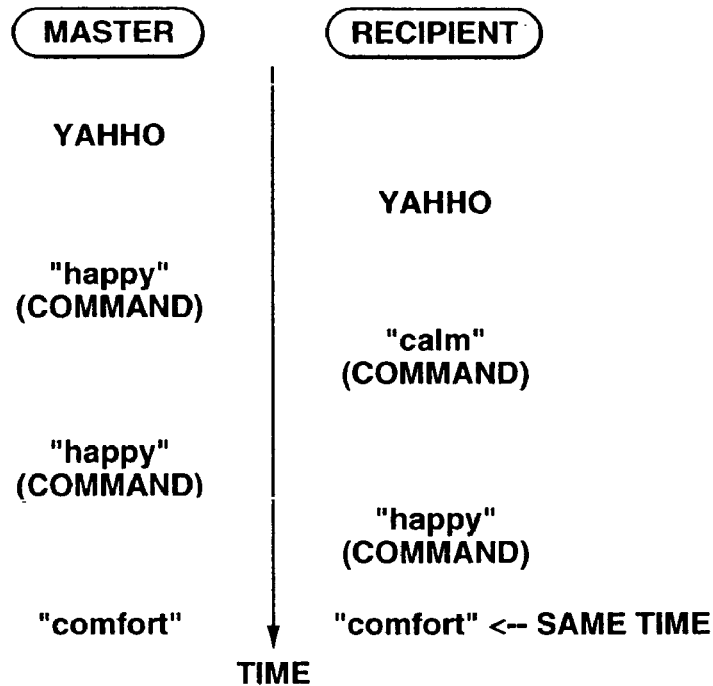
FIG. 14 shows dialog exchange in case both a main robot apparatus and a recipient robot apparatus are happy.
Figure 15:
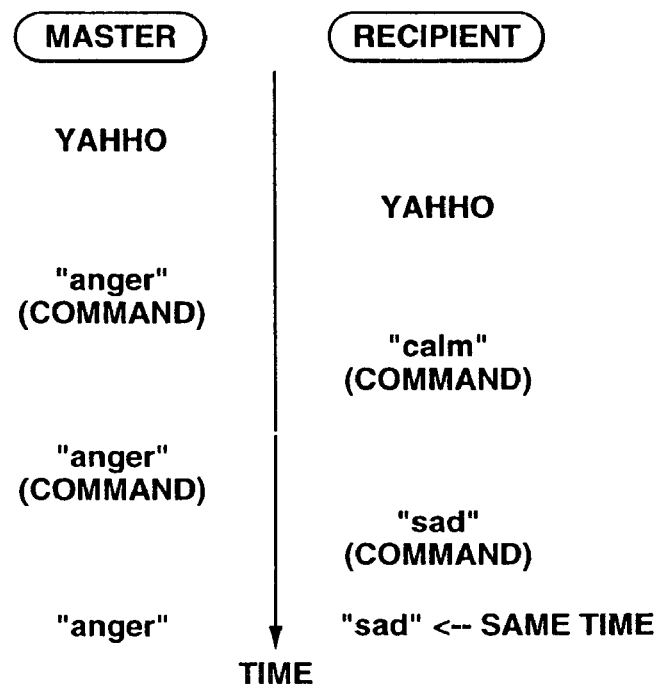
FIG. 15 shows dialog exchange in case the master robot apparatus is angry and the recipient robot apparatus is happy.
Figure 16:
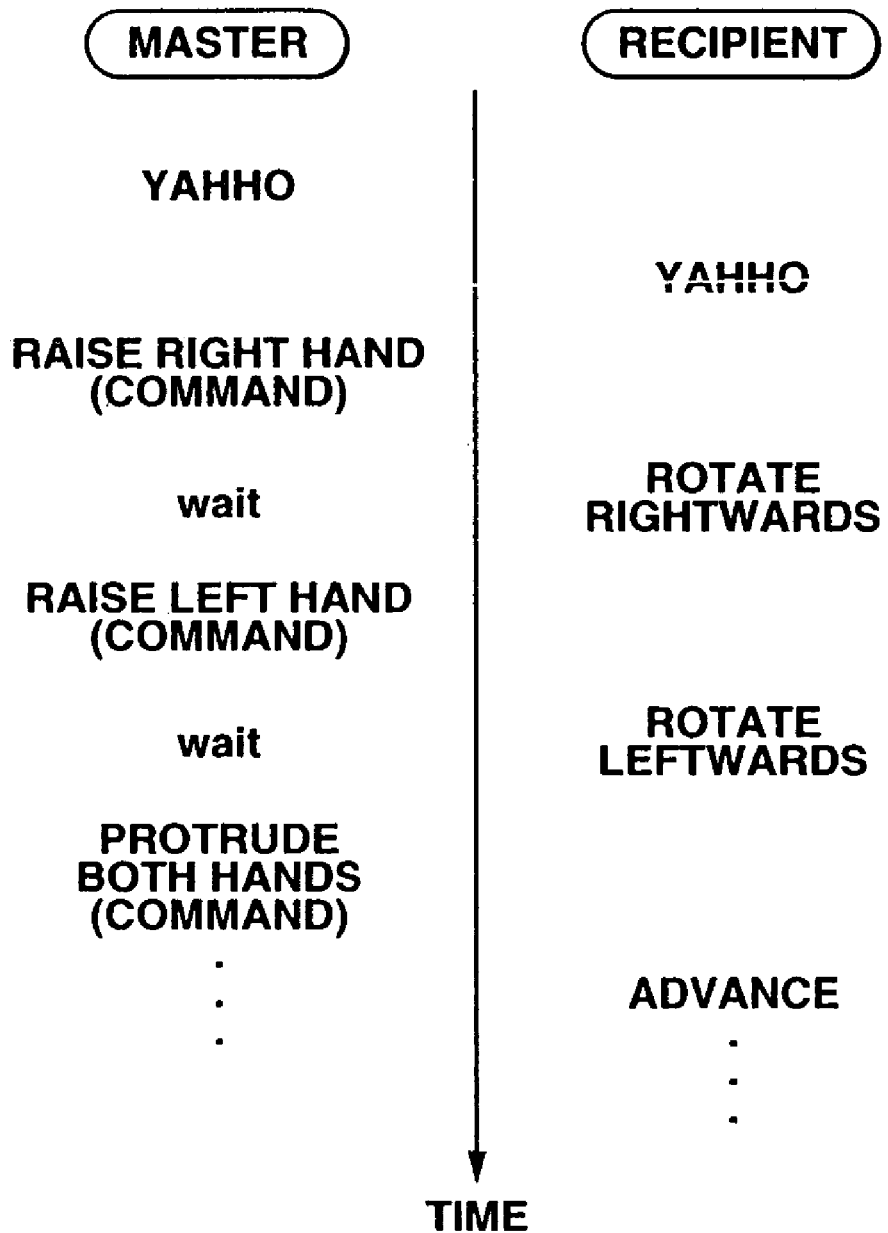
FIG. 16 shows dialog exchange in case the master robot apparatus issues a command and the recipient robot apparatus operates responsive to the command.

In FIGS. 14 to 16, the reactive actions between the robot apparatus (master robot apparatus and the recipient robot apparatus), realized by the above-described dialog function, are indicated chronologically.

FIG. 14 shows dialog exchange in case both the master and the recipient are happy, FIG. 15 shows that in case the master is angry and the recipient is being scolded and FIG. 16 shows that in case the master issues a command and the recipient operates in response thereto. These variable dialog functions are implemented as the behavior model.

Specifically, when the master utters 'Yahhoo!', the recipient utters 'Yahhoo!' as a reactive action. Meanwhile, if the enunciation is felt to be possibly understood with relative ease, the scale sound need not be output. That is, if the enunciation such as 'Yahhoo!' can be recognized readily, the master utters only 'Yahhoo!', without correspondingly outputting the scale sound, with the counterpart side robot apparatus then recognizing this 'Yahhoo!'.

The master is responsive to the recipient's enunciation 'Yahhoo!' to utter 'Happy' and the scale sound (sound scale command)', while the recipient responsive to the enunciation 'Happy' and 'the scale sound' of the master utters 'calm' and 'the scale sound'. The master responsive to the recipient's enunciation 'Happy' and 'the scale sound' again recognizes the enunciation 'the scale sound' utters 'Happy' and 'the scale sound'. The recipient is responsive to the master's enunciation 'Happy!' and the 'scale sound' to recognize the 'scale sound' to utter 'Happy' and 'the scale sound'. The master responsive to the enunciation 'Happy' and 'the scale sound' of the recipient utters 'comfort' as the last action of the dialog, whilst the recipient utters 'comfort', in synchronism therewith, as the last action of the dialog.

FIG. 15 shows an exchange in case the master is angry and the recipient is being scolded. In this case, when the master utters 'Yahhoo!', the recipient utters 'Yahhoo!', as a reactive action. The master responsive to the recipient's enunciation 'Yahhoo!' utters 'anger' and 'the scale sound (scale sound command)', while the recipient responsive to the master's enunciation 'anger' and 'the scale sound' recognizes the enunciation 'scale sound' to utter 'calm' and 'the scale sound'. The master responsive to the recipient's enunciation 'calm' and 'scale sound' recognizes the enunciation 'scale sound' to utter 'angry' and 'the scale sound'. The recipient responsive to the master's enunciation 'anger' and 'the scale sound' recognizes the 'scale sound' to utter 'sad' and the 'scale sound'. The master responsive to the enunciation 'sad' and the 'scale sound' utters 'anger' as the last action of the dialog. In synchronism therewith, the recipient utters 'sad' as the ultimate action of the dialog.

As for exchange in case the master issues a command and the recipient operates responsive thereto, shown in FIG. 16, the master first utters 'Yahhoo!', while the recipient is responsive thereto and utters 'Yahhoo!'. The master raises his or her right hand (right fore limb), and utters 'scale sound (sound scale command) responsive to the recipient's enunciation 'Yahhoo!', while the recipient is responsive to the master's action of raising his or her right hand (right fore limb) and the enunciation 'scale sound (scale sound command) to recognize the enunciation 'sound scale' to perform the action of rightward rotation of his or her body.

Although the recipient is able to apprize the master of the end of the action by the scale sound, the master may also perform time management to detect the end of recipient side's action. For example, the master may hold the time of execution of the rightward rotation of the recipient's body, measure the time elapsed as from the time of raising the right hand or uttering the scale sound and compare the measured time with the time of execution of the rightward rotation it holds to grasp the end of the rightward trunk rotation of the recipient actually proceeding.

After detection of the end of the recipient's rightward rotation, the master performs the action of raising the left hand (left fore limb), while uttering the 'scale sound (sound scale command). The recipient is responsive to the master's action of raising the left hand (left fore limb), and to the 'scale sound (sound scale command) to recognize the enunciation of the 'scale sound' to perform the action of rotating its trunk leftwards. The master then measures the time elapsed since raising the left hand or since the enunciation of the scale sound and compares it to the time of execution of the leftward rotation it holds to be apprized of the end of the leftward rotation the recipient is actually performing.

After detecting the end of the recipient's leftward rotation, the master performs the action of raising both hands (both fore limbs), while uttering 'scale sound (sound scale command)'. The recipient is responsive to the master's action of raising both hands (both fore limbs) and the enunciation (sound scale command) to recognize the enunciation 'sound scale sound' to perform an action of moving forwards.

In this manner, the exchange proceeds in the case where the master issues a command and the recipient operates responsive thereto.

As explained in the foregoing, with reference to FIGS. 14 to 16, the robot apparatus is able to realize various dialogs with the counterpart side robot.

In the above-described embodiment, the communication between the robot apparatus takes place by the scale sound. This, however, is not limitative, such that, for example, the information can be transmitted or received between robot apparatus by infrared rays.

Likewise, in the above-described embodiment, the dialog by the actions of the robot apparatus is made mainly based on the sound outputting or speech uttering action. This again is not limitative such that the dialog may also be had by actuating movable parts, such as limbs. In such case, the robot apparatus recognizes the counterpart side's action by image recognition means, such as CCD camera 20. If it is retained to be rather difficult to recognize the movement of the robot apparatus, the scale sound, for example, may be output in keeping with the movement of the robot apparatus to permit the meaning of the movement action to be recognized by the scale sound to achieve the reliable dialog between robot apparatus.

If the robot apparatus autonomously generates the sentence to utter the speech, which may be complex and difficult to understand, the counterpart robot apparatus is able to act reliably to comply with the complex text by simultaneously outputting the content information as the scale sound.

INDUSTRIAL APPLICABILITY

According to the present invention, as described above, a robot apparatus is able to detect the information contained in an action output by another robot apparatus by action detection means to cause action outputting means to output an action corresponding to the information as detected by the action detection means, so that the robot apparatus is able to operate responsive to the action of other robot apparatus to improve the entertainment performance of the robot apparatus.

The invention claimed is:

1. A mobile robot apparatus having an action part, comprising:
    action detection means for detecting the information contained in an action output by another robot apparatus;
    action part control means for controlling said action part, based on the information detected by said action detection means; and
    means for measuring the number of times of reactions of said another robot apparatus corresponding to the actions output by said action part;
    said action part control means outputting an action by said action part depending on the number of times of reactions of said another robot apparatus.

2. The robot apparatus according to claim 1 wherein said information is the emotion information of said other robot apparatus.

3. A robot apparatus comprising:
    action detection means for detecting the information contained in an action output by another robot apparatus;
    action outputting means for outputting an action corresponding to the information as detected by said action detection means;
    means for measuring the number of times of reactions of said another robot apparatus corresponding to the actions output by said action part; and
    said action outputting means outputting an action by said action part depending on the number of times of reactions of said another robot apparatus.

4. The robot apparatus according to claim 3 wherein said information is the information on the meaning of said action.

5. The robot apparatus according to claim 3 wherein the output action is an outputting action of outputting a sound signal.

6. The robot apparatus according to claim 3 wherein the robot apparatus changes the emotion based on an external environment and/or the internal state and executes an autonomous behavior based on said emotion.

7. The robot apparatus according to claim 3 wherein said other robot apparatus changes the emotion based on an external environment and/or on an internal state and expresses the emotion in said action to output said action; and wherein
    said action detection means detects the emotion performed in said action as said information.

8. The robot apparatus according to claim 3 further comprising:
    communication means for transmitting receiving the information with said other robot apparatus.

9. The robot apparatus according to claim 8 wherein said communication means sends the information on the meaning of said action in association with the action output by said action outputting means.

10. The robot apparatus according to claim 8 wherein said communication means executes communication by infrared ray signals.

11. The robot apparatus according to claim 3 wherein the action outputting means outputs a preset action when in a preset state.

12. The robot apparatus according to claim 11 wherein the robot apparatus changes the emotion based on an external environment and/or on the internal state; and
    wherein when the level of the emotion is at a preset level as said preset state, said action outputting means causes the emotion to be expressed in its action to output the resulting action.

13. A method for controlling the action of a mobile robot apparatus having an action part, said method comprising:
    an action detection step of detecting the information contained in an action output by another robot apparatus;
    an action part controlling step of controlling said action part, based on the information detected by said action detections step; and
    a step of measuring the number of times reactions of said another robot apparatus based on the actions output by said action part;
    said action part controlling step outputting an action by said action part depending on the number of times of reactions of said another robot apparatus.

14. The action controlling method according to claim 13 wherein said information is the emotion information of said other robot apparatus.

15. A method for controlling the action of a robot apparatus comprising:
    an action detection step of detecting the information contained in an action output by another robot apparatus;
    an action outputting step of causing one of the robot apparatus to output an action corresponding to the information as detected by said action detection step;
    a step for measuring the number of times of reactions of said another robot apparatus corresponding to the actions output by said action part; and
    said action outputting step outputting an action by said action part depending on the number of times of reactions of said another robot apparatus.

16. The action controlling method according o claim 15 wherein said information is the information on the meaning of said action.

17. The action controlling method according o claim 15 wherein the output action is an action of outputting a sound signal.

18. The action controlling method according to claim 15 further comprising:

a transmission step of transmitting the information on the meaning of said action in association with an action output at said action outputting step.

19. An action control system for a plurality of robot apparatus performing an action corresponding to an action of a robot apparatus, said system comprising:

a plurality of robot apparatus including action detection means for detecting the information contained in an action output by said counterpart robot apparatus;

action outputting means for outputting an action corresponding to said information detected by said action detection means;

means for measuring the number of times of reactions of said counterpart robot apparatus corresponding to the actions output by said action part; and said action outputting means outputting an action by said action part depending on the number of times of reactions of said counterpart robot apparatus.

20. The action control system for the robot apparatus according to claim 19 wherein said information is the information on the meaning of said action.

21. The action control system for the robot apparatus according to claim 19 wherein said action is the action of outputting the sound.

22. The action control system for the robot apparatus according to claim 19 wherein the robot apparatus includes communication means for transmitting/receiving the information with said counterpart apparatus; and wherein one of the robot apparatus transmits the meaning information of said action, by said communication means, in association with an action output by said action outputting means;

the other robot apparatus receiving said meaning information by said communication means and detecting the meaning information by said action detection means as the information contained in said action.

23. The action control system for the robot apparatus according to claim 22 wherein said communication means performs communication with the infrared rays.

* * * * *